INTERCOMMUNICATIONS SYSTEM

Filed July 11, 1966 3 Sheets-Sheet 1

INVENTOR.
DAVID PUGATCH
BY
[signature]
ATTORNEYS

INVENTOR.
DAVID PUGATCH
BY
Flehr and Swain
ATTORNEYS

INTERCOMMUNICATIONS SYSTEM

Filed July 11, 1966 3 Sheets-Sheet 3

INVENTOR.
DAVID PUGATCH
BY
Flehr & Swain
ATTORNEYS

United States Patent Office 3,478,176

Patented Nov. 11, 1969

3,478,176
INTERCOMMUNICATIONS SYSTEM

David Pugatch, Lafayette, Calif., assignor to Fisher Berkeley Corporation, Emeryville, Calif., a corporation of California Filed July 11, 1966, Ser. No. 564,193
Int. Cl. H04m *1/70*
U.S. Cl. 179—39 5 Claims

ABSTRACT OF THE DISCLOSURE

An intercommunications system having master and staff stations in which a voltage derived from a simplex circuit is used for locking out other stations not involved in the present communication.

The present invention is directed to an intercommunications system and more particularly to a system which includes several communicating stations and which locks locks out a third station or any other number of stations from either monitoring or calling two other stations which are communicating with each other. Such third station may, however, still communicate with other non-busy stations.

In an intercommunications system connecting several rooms, for example, of a school or office, it is desirable, while two stations are communicating, to lock out any other station from these two communicating stations; in other words, it is desired that a third station can neither monitor or call either of the two communicating stations. In the past, such a lockout feature has been obtained only by relatively extensive multiple relay arrangements. Such arrangements are both expensive and need frequent repair.

Therefore, it is a general object of the present invention to provide an improved intercommunications system which provides the above mentioned lockout feature in a simple and inexpensive manner.

It is a more specific object of the invention to provide an intercommunications system which will provide the improved lockout feature but is also capable of signalling one of the communicating stations that it is being called by another station.

Figure 1:
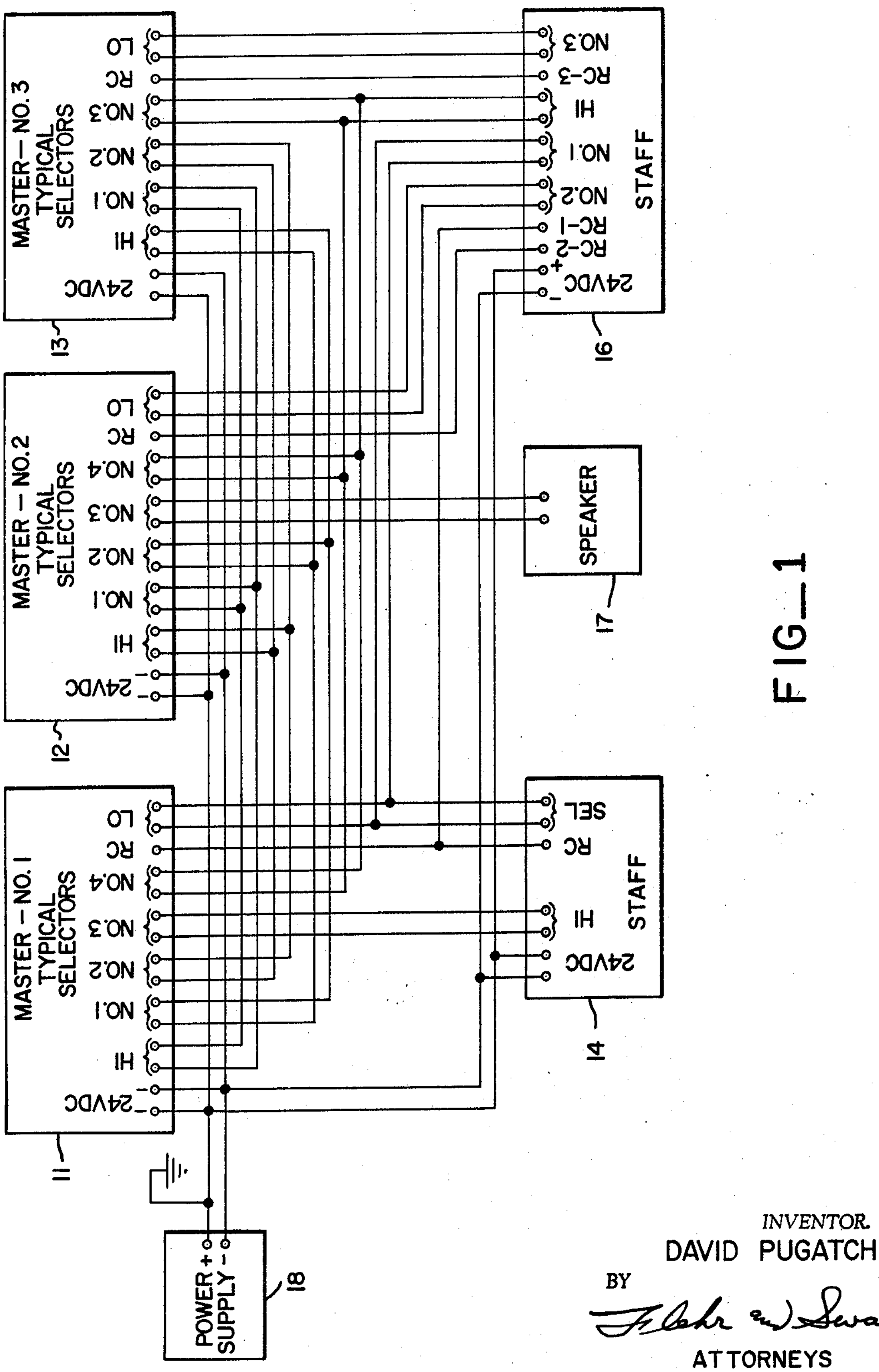
FIGURE 1 is a block diagram of typical stations of the intercommunications system of the present invention showing the cabling between stations.

In an intercommunications system which embodies the present invention, there may be basically two types of stations; a master station and a staff station. Three masters are shown in FIGURE 1 (11, 12, 13) which have been designated as master No. 1, master No. 2, and master No. 3. Several different types of terminals are located on each master station which will be explained in detail below. Also included are staff stations 14 and 16 which have the ability of communicating with a selected master station but cannot communicate among themselves since they have no amplifying means. A speaker 17 is coupled to master station No. 2. Power for all of the stations including the master stations 11–13 and staff stations 14, 16 is supplied by a power supply 18 which rectifies AC line voltage converting to low voltage DC.

Figure 2:
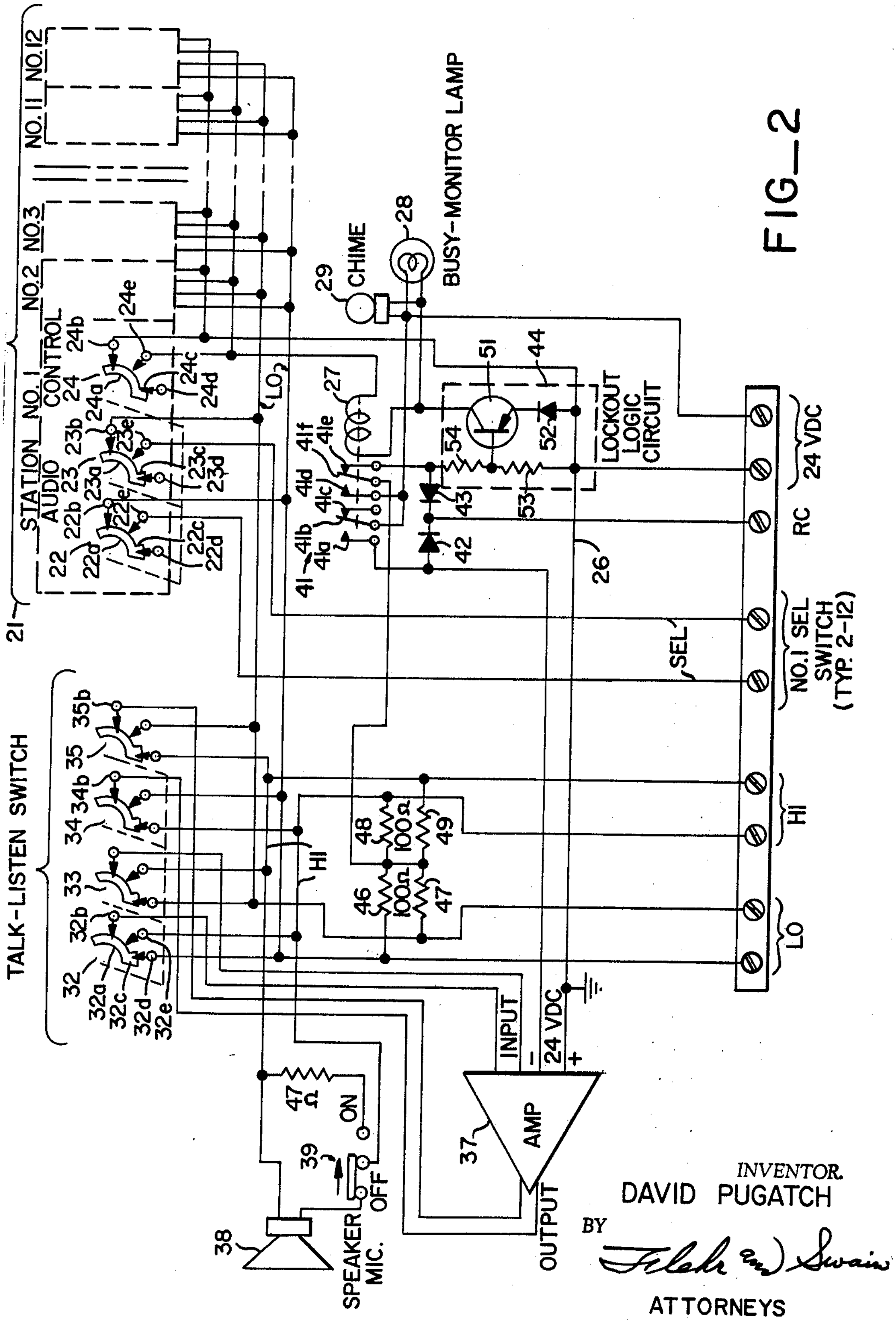
FIGURE 2 is a schematic circuit of one type of station of the present invention.

A typical master station is shown in detailed schematic form in FIGURE 2. It includes a station selector section 21 having a number of individual selectors each associated with a particular staff or master station to be communicated with. As illustrated in the preferred embodiment, there are 12 station selectors. However, additional selectors may be easily added in parallel. Station selector No. 1 is representative and consists of a rotary switch which includes three poles 22, 23 and 24. Each pole has arcuate rotary switching arms *22a*, *23a* and *24a*, respectively, which are in permanent sliding contact with fixed terminals *22b*, *23b* and *24b*, respectively. In the off position the rotary contacts *22a–24a* have enlarged sector portions *22c*, *23c* and *24c* in contact with floating terminals *22d*, *23d* and *24d*. Third terminals *22e*, *23e* and *24e* are provided for each pole which contact portion *c* when the switch is rotated to its on condition. The angle subtended by sectors *22c* and *23c* are equal and greater than the angle subtended by sector *24c*; thus, when the switch is rotated to its on position, initial contact is first made by the poles 22 and 23 and subsequently by pole 24.

Terminals *22b* and *23b* are connected to each side of a "LO" line. Terminal *24b* is coupled to a grounded positive voltage supply line 26 and terminal *24e* to a relay coil 27. The remaining station selectors are coupled in parallel to the LO line pair and to terminal *24b* and *24e*.

Terminals *22e* and *23e* are coupled to a pair of selector lines which extend to the remote station designated as station No. 1. Thus when the typical station shown in FIGURE 2 desires to speak or communicate with station No. 2, the switch is moved to on condition to interconnect the selector lines with the LO line. This is accomplished by the audio poles 22, 23 of the selector switch. The control pole 24 electrically couples terminals *24b* and *24e* to energize coil 27 by completing the circuit from the ground or plus voltage supply to relay coil 27 and through series connected lamp and chime 28, 29 (which are connected in parallel with each other) to a minus voltage supply. Relay coil 27 has a relatively high resistance compared to chime 29 to cause a current to flow in this circuit which is sufficient to actuate the relay but insufficient to energize either chime 29 or lamp 28. For example, typical current values are 10 milliamperes for actuating the relay, 200 milliamperes to actuate the chime 29 and 60 milliamperes to energize lamp 28.

The LO line pair is terminated on a terminal strip, as schematically indicated, for connection to staff stations from which calls are to be received. In addition, a parallel connected branch extends to a talk-listen switch 31 having poles 32–35. The configuration of the individual poles is identical to the audio poles 22–23 of station selector switch 21 and similar letters indicate similar terminals of the switch. However, the terminals *32d–35d* are non-floating and are coupled to portions of the circuit to be described hereafter. Furthermore, the expanded sector portions *32c–35c* are all identical. The talk-listen switch is a monostable spring loaded device which is normally in the listen position as shown to connect the LO line to the input of an amplifier 37. This is accomplished by means of poles 32 and 33 which interconnect terminals *32d* and *32b* on pole 32 and the similar terminals on pole 33. The output of amplifier 37 is coupled to terminals *34b* and *35b* and interconnected while the switch is in the listen position to a "HI" line pair which is terminated at a speaker-microphone 38. In addition, a parallelled HI line pair extends to the terminal strip for interconnection to other master stations. Thus to summarize the interconnections between the LO and HI line pairs, when the talk-listen switch is in the listen position, the LO pair extends through poles 32 and 33 to the input of amplifier 37, the output of the amplifier being coupled to poles 34 and 35 which in turn connect the output to the HI line and speaker 38.

Activation of the talk-listen switch interconnects terminals *b* and *e* to reverse the input and output of the amplifier from the LO line to the HI line. In other words, the speaker-microphone 38 is now coupled on the HI line to the input of the amplifier 37 and the output of the amplifier is coupled to the LO line. Therefore, in the listen position any low level audio energy on the LO line is amplified and coupled to the audio transducer 38 which serves as a speaker. In the case where the talk-listen switch is in the talk position, transducer 38 serves as a microphone since low level energy on the HI line is now amplified by amplifier 37 and coupled to the LO line. It is apparent that any interconnection between the LO and HI line must extend through amplifier 37.

A privacy switch 39 is series connected in one of the leads to speaker-microphone 38 to open a speaker line when the user moves an external switch button to the on position. The HI line is then terminated across a 47 ohm resistor. This prevents any other station from monitoring.

Amplifier 37 is energized in either of two modes. In the first case where the station itself wishes to speak to another station, the actuation of a station selector switch such as switch No. 1 energizes the relay coil 27 to move the associated contacts 41 from their normal rest position to an on position. The amplifier 37 in its off condition is coupled to ground or plus line 26 and has its negative supply voltage line coupled to a fixed terminal 41*a* of switch 41 which is normally open and in addition coupled to the anode of a diode 42 which has its cathode coupled to an "RC" terminal connector. A moving arm 41*b* is normally in contact with floating terminal 41*c* and is coupled to the negative voltage supply. Actuation of the relay moves contact 41*b* into contact with terminal 41*a* to complete a minus energizing circuit to the amplifier 37.

In an alternate mode of energization, negative voltage on the RC terminal energizes the amplifier through diode 42.

Switch 41 also includes fixed terminals 41*d* and 41*e* and moving arm 41*f*. Fixed terminal 41*d* is coupled along with moving arm 41*b* to the negative voltage source and fixed terminal 41*e* to the anode of a diode 43 having its cathode coupled to the RC terminal. In addition, a lockout logic circuit 44, indicated by the dashed line block and to be described in detail below, is coupled to fixed terminal 41*e*.

Moving arm 41*f* is coupled to the electrical center of both the LO and HI lines; more specifically, the LO line has a pair of series connected resistors 46 and 47 connected across the line between which moving arm 41*f* is connected and similarly the HI line includes series resistors 48 and 49 which are connected to arm 41*f*. Resistors 46–49 in combination with the moving arm 41*f* form a simplex circuit; HI and LO lines form the metallic pair of the simplex circuit for conduction of a negative voltage derived from either the negative DC voltage source or the RC line. Current flows in one direction on the LO and HI lines and a ground return to line 26 is provided. The fact that the minus voltage on the LO and HI lines occurs in equal amounts on both lines of a pair causes them to cancel out at any termination, such as microphone speaker 38, to thus eliminate any interference with the audio signal.

Lockout logic circuit 44 comprises a transistor 51 having its collector connected to one side of relay coil 27 and the lamp 28 and chime 29; the emitter is coupled through a diode 52 to the plus voltage supply 26 and the base is coupled between series connected resistors 53 and 54. The other side of resistors 54 is connected to terminal 41*e* of switch 41 and the other side of resistor 53 to ground or plus line 26.

Figure 3:
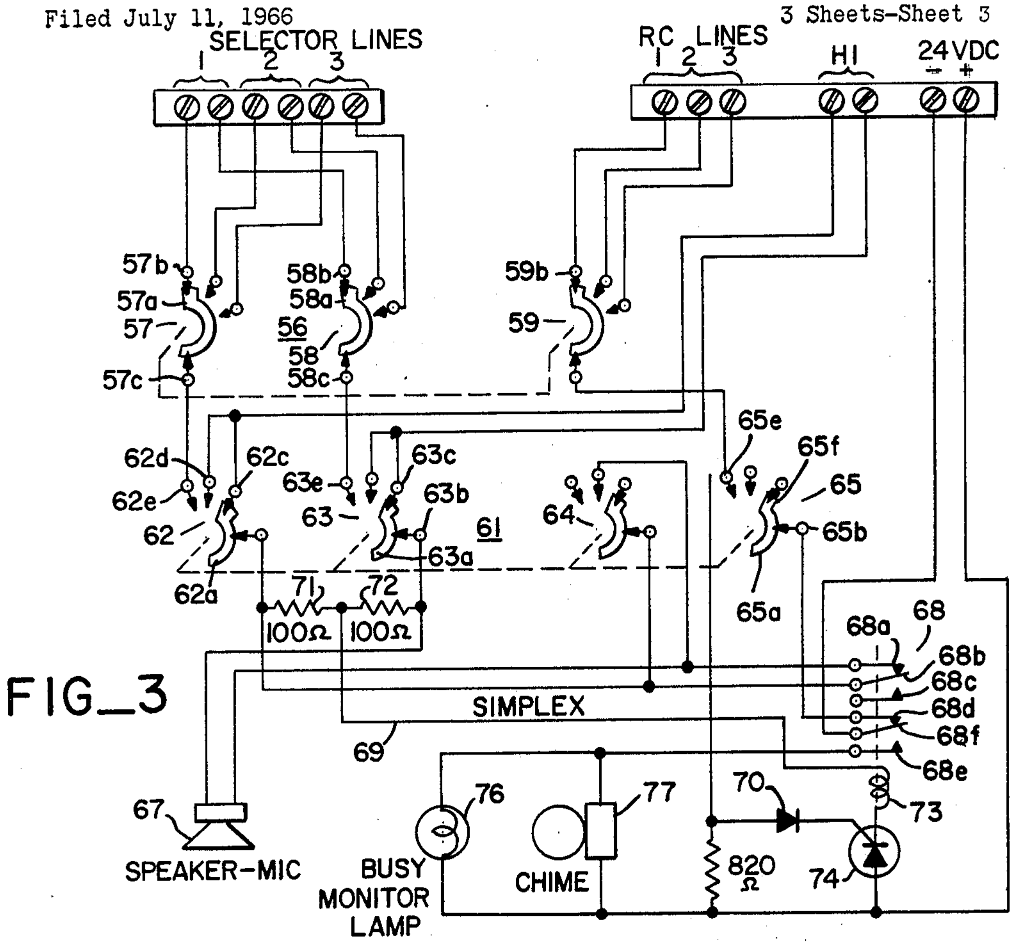
FIGURE 3 is a schematic circuit of another type of station of the present invention.

A typical staff station as illustrated in FIGURE 3 with a terminal strip corresponding to that of the staff station 16 shown in FIGURE 1. Staff station 14 (FIGURE 1) is identical except that it has the ability to select only a single master. In the typical case illustrated the staff or remote station is provided with three pairs of selector lines which are switched through a three pole switch 56 having poles 57, 58, and 59. Poles 57 and 58 include the arcuate rotary contacts 57*a* and 58*a* with enlarged sectors 57*b* and 58*b* which sequentially make contact with terminals connected to selector lines which are associated with different master stations. Fixed terminals 57*c* and 58*c* which are in continuous sliding contacts 57*a* and 58*b* are coupled to an audio line pair which extends to a four pole switch 61 having poles 62–65. Switch 61 has three positions. In the first position arcuate arms 62*a*–65*a* by means of enlarged sectors 62*f*–65*f* couple terminals 62*b*–65*b* to terminals 62*c*–65*c*, respectively; similarly in the second and third positions terminal *b* is coupled to terminals *d* and *e*.

The audio line pair from switch 56 terminates at fixed terminals 62*e* and 63*e* of the similarly numbered poles. Rotary arms 62*a* and 63*a* are continuously in contact with fixed terminals 62*b* and 63*b* which extend to the speaker-microphone 67 through either a series connected switch 68 or pole 64. A minus voltage is provided on a line 69 by a pair of resistors 71 and 72 coupled across terminals 62*b* and 63*b*.

Simplex line 69 extends to one side of a relay coil 73 which actuates switch 68, the other side of the relay coil coupling to the cathode of silicon controlled rectifier (SCR) 74. The anode of the rectifier is coupled to a plus voltage supply and the activating gate terminals to terminal 65*e* of pole 65, which in turn is selectively coupled to one of three RC lines through pole 59 of selector switch 56. The gate circuit of SCR 74 is also connected to the plus supply line through an 820 ohm resistor. A diode 70 series connected in the gate circuit prevents any accidental flow of harmful current into the gate.

Switch 68, which is activated by relay coil 73, includes a first set of contacts, 68*a* and 68*b*, which are series connected in the audio line to speaker microphone 67. Fixed contact 68*a* is normally in contact with the moving arm 68*b* to complete the connection. The terminal 68*c* is floating. The second portion of the switch includes fixed terminals 68*d* and 68*e* and moving arm 68*f*. In the inactivated or off position, arm 68*f* is in contact with terminal 68*d* to close a circuit between the minus supply voltage and fixed terminal 65*b* of pole 65 which is in continuous contact with a moving rotary contact 65*a*. In its activated position, moving arm 68*f* contacts fixed terminal 68*e* to connect the minus supply voltage to one side of a busy monitor lamp 76 and a chime 77, their other sides being coupled to the plus supply line.

The staff station as shown in FIGURE 3 also has a HI line extending from the terminal strip to poles 62 and 63. The rotary arms 62*a* and 63*a* couple to this HI line in both the first and second rotary positions of the switch. Any calls from a master to a staff station are made over this HI line.

OPERATION

Master station communicating with master station

When one master station wishes to communicate with another master station the appropriate selector on the calling master station is actuated. For example, assume that the typical master of FIGURE 2 is the calling master and wishes to communicate with master No. 1 as shown in FIGURE 1. Selector station switch No. 1 is actuated to its on condition to energize relay coil 27. Switch arm 41*b* moving into contact with terminal 41*a* places a minus voltage on the power input to amplifier 37 to energize the amplifier. At the same time, switch arm 41*f* moving into contact with 41*d* places a minus voltage by means of the simplex arrangement on the LO and HI lines. This minus voltage as will be explained below prevents any third station from either monitoring or breaking into the conversation between the two master stations. The opening of contact between fixed terminal 41*e* and arm 41f prevents any of the minus voltage from being applied to the lockout logic transistor 51. Thus transistor 51 will remain in an off or open circuit condition. The No. 1 selector line is coupled as indicated in FIGURE 1 to the HI terminals of master No. 1. These are directly coupled to speaker-microphone 38 of the master being called and, assuming that privacy switch 39 is off, there will be a direct connection between speaker microphone 38 to the HI line of master No. 1 and to the selector line pair of the calling master. This selector line pair is coupled to the LO line through the talk-listen switch to the input of amplifier 37. The output of the amplifier goes through the talk-listen switch to the speaker-microphone 38 of the calling master. Thus any conversation which can be detected by the called master's microphone will be amplified by amplifier 37 and projected over speaker 38. When the calling master wishes to talk, the talk-listen switch is moved to its talk position, to reverse the input and output of amplifier 37, causing the transducer 38 to be a microphone of the calling master and the transducer 38 of the called master No. 1 to become a speaker.

Monitor lamp 28 and chime 29 of the called master No. 1 are also activated since the minus voltage on the HI line is coupled through switch arm 41f and contact 41e to the base of transistor 51. The transistor is activated causing a plus voltage to be placed on one side of the lamp-chime circuit, the other side already being coupled to the minus supply voltage. Even if the privacy switch of the called master is on, this station will be notified of a caller.

The lockout feature of the present invention operates in the following manner. In the case where the third station attempting to monitor or break into the conversation is another master station (for example, master No. 2), this master would operate his selector switch for either the No. 1 or No. 3 master station. If the calling station, No. 3, is selected, the selector line pair will couple to the HI line of the No. 3 station on which minus voltage is present. Thus the third station which is attempting to interfere will have minus voltage coupled through its own selector switch to its LO lines which in turn will produce a voltage of minus polarity through resistors 48–49 to the transistor 51 to energize transistor 51. This places a plus voltage on one side of relay coil 27 energizing the busy monitor lamp 28 indicating the station attempted to be called is busy at the time and also activating the chime 29. Such plus voltage also energizes coil 27 since coupling of the other side of the coil to a plus voltage by pole 24 produces no potential difference. Thus switch 41 is prevented from operation and the amplifier 37 of the third station cannot operate. Any possible cascading is prevented, as for example in the case where two masters would be interconnected with both of their amplifiers on at the same time. Also the third master cannot place audio energy on its selector line to the HI line of a called station since its amplifier cannot be energized.

Concurrently, the lockout feature prevents monitoring by the third station since there is an open circuit between the selector line of the third master and its speaker microphone 38. The open circuit is provided by the fact that the LO line of this third station connects with its speaker 38 and HI line only through its amplifier 37. And since this amplifier, as mentioned above cannot be energized, there is an open circuit.

Where a staff station as illustrated in FIGURE 3 is attempting to break into the conversation between two masters, switch 61 will be placed in the third or "CALL" position. If the called station is busy, it will have a negative voltage on its LO line, through which the staff station calls the master, and this will appear on simplex line 69. Such voltage activates relay coil 73. SCR 74 is conductive at the time since its gate input will have a positive voltage on it from the plus DC voltage source. The relay remains activated even though pole 65 of switch 61 when moved to the calling position completes a circuit through to the minus voltage supply since contacts 68d and 68f are now opened. Sector 65f of rotary contact 65a subtends a lesser angle than the sector of poles 62, 63 and 64 to prevent attempted application of a minus voltage before coil 73 is energized and the relay opens. A busy indication is given by lamp 76 and chime 77 which are activated by the moving of switch arm 68f to terminal 68e.

Monitoring is prevented by the opening of contacts 68a, 68b which open the circuit to speaker 67. Pole 64 cannot complete the circuit since the middle or "MONITOR" position causes poles 62 and 63 to break contact with the selector lines. Finally, the opening of contacts 68c and 68d prevents any minus voltage being applied over the RC line to energize the master's amplifier 37 through the diode 42.

Thus in summary the lockout circuitry of a staff station prevents the energization of the amplifier in a master being called where that particular master is the called master and thus is not using its amplifier. In addition, monitoring is prevented since an open circuit is maintained in the speaker audio pair.

Staff station communicating with master station

Where a staff station wishes to communicate with a master, its selector switch 61 is moved to the "CALL" position and this places a minus voltage by means of pole 65 on terminal 65e which through station selector switch 56 is applied to the RC input line of the master being called. Minus voltage on the RC line (FIGURE 2) activates the amplifier 37 through diode 42 and in addition activates transistor 51 through diode 43 to energize busy monitor lamp 28 and chime 29. At this time, communication may take place between the staff and the master. The master station activating the talk switch when he wishes to reply to the staff station. Since the amplifier of the called master is activated, negative voltage will be placed on both its LO and HI lines and thus any other master or staff attempting to call either the staff or master which are communicating will be locked out in the manner described above.

Figure 4:
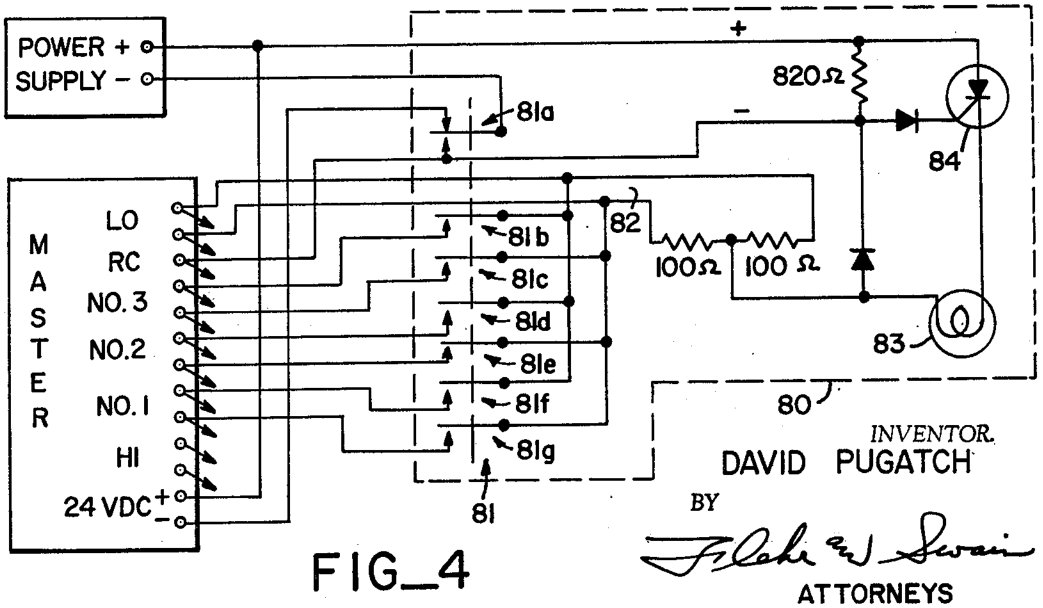
FIGURE 4 is a schematic circuit diagram of an optional feature of the invention which also shows its cabling to a station.

Both the master and staff stations provide against sensing the internally generated minus voltage which could produce an erroneous lockout. In the case of a master station, switch 41 opens the connection of the LO and HI lines to the base of the lockout transistor 51. With a staff station the switch 68 provides minus gate voltage on SCR 74 to prevent this lockout relay 73 from operating.

Where an "All Call" feature is desired to allow a master station to simultaneously call all other stations, the circuitry shown in FIGURE 4 in dashed block 80 may be added. The existing connections to the master are retained except for a modification of the power supply connection to couple the minus supply line through a switch assembly 81a of the ganged "ALL CALL" switch 81.

When switch 81 is activated, the minus voltage line is coupled to the RC terminal to energize amplifier 37. At the same time, all of the selector lines are tied together by switch assemblies 81b–81g.

The tied selector line pair 82 is terminated with series connected 100 ohm resistors with one side of a lamp 83 connected therebetween. The other side of the lamp is coupled through SCR 84 to the plus voltage line. If any station is busy, minus voltage on a selector line energizes the busy lamp 83. Application of a minus voltage on the RC line to the gate of SCR 84 will not open the busy circuit since the SCR once closed, remains in this condition until the anode-cathode voltage is removed. A proper time delay in switch portion 81a is provided by, for example, using a rotary switch having a smaller sector as explained previously.

With the intercommunications system of the present invention, a simple and economical lockout circuit is provided which prevents a third station from either monitoring or breaking into the conversation of two communicating stations. But, the lockout circuit still allows the third station to subsequently communicate with another non-busy station since the third station returns to a normal condition when its selector disconnects from the busy line.

I claim:

1. An intercommunications system having at least three stations, each of such stations having audio transducers and each of such stations having at least a pair of selector lines for connecting the audio transducer of one station to the audio transducer of another station to be called, at least two of said stations having amplifier means for amplifying an electrical signal output from an audio transducer, the system comprising: means for a first calling station to apply to simplex circuit means a voltage of a predetermined polarity on each of a pair of selector lines coupling the first calling station to a second calling station, such means including amplifying means connected to such selector lines, said simplex circuit means including said selector lines; means for coupling said pair of selector lines for deriving said voltage from said line pair; and means responsive to said derived voltage and included in a third station for disabling such station from either monitoring or calling said first or second stations, such means comprising means for preventing energization of amplifier means associated with the selector lines connecting said third station to one of said communicating stations, and also including means for maintaining an open circuit between such selector lines and the audio transducer of said third station.

2. An intercommunications system as in claim 1 where said first and second calling stations are master stations having their own amplifying means, and said third station is a staff station having no amplifying means, and in which said third station includes means for preventing energization of an amplifying means in one of the master stations which the third station is associated with by means of selector lines whereby cascading is prevented between said two master stations, relay means also being provided for opening the circuit between the audio transducer of the staff station and such selector lines in response to said derived voltage whereby said staff station is prevented from monitoring either of said master stations.

3. An intercommunications system as in claim 1 in which said means for maintaining an open circuit between such selector lines and an audio transducer of a third station includes amplifying means which are de-energized.

4. An intercommunications system as in claim 1 in which derived voltage also activates a busy indicator which is included in said third station.

5. An intercommunications system having at least three stations, each of such stations having audio transducers, and each of such stations having at least a pair of selector lines for connecting the audio transducer of one station to the audio transducer of another station to be called, one of such stations being a master station having amplifier means for amplifying an electrical signal output from an audio transducer, and said other two stations being staff stations having no amplifying means coupled to an audio transducer, the system comprising: means for said master station to apply to simplex circuit means a voltage of a predetermined polarity on each of a pair of selector lines coupling said master station to one of said staff stations, such means including said amplifying means connected to said selector lines, said simplex circuit means including said selector lines; means for coupling said pair of selector lines for deriving said voltage from said line pair; and relay means included in said third staff station and responsive to said derived voltage for disabling such station from either monitoring or calling said first or second stations, including means coupled to said relay means for maintaining an open circuit in the audio transducer circuit of said third station.

References Cited

UNITED STATES PATENTS

| | | | |
|---|---|---|---|
| 3,283,073 | 11/1966 | Campbell | 179—38 |
| 3,215,781 | 11/1965 | Yong | 179—39 |
| 3,061,686 | 11/1959 | Lummis | 179—39 |
| 2,662,115 | 12/1953 | Campbell | 179—1.4 |

KATHLEEN H. CLAFFY, Primary Examiner

D. L. RAY, Assistant Examiner